(12) United States Patent
Harris et al.

(10) Patent No.: US 9,869,570 B1
(45) Date of Patent: Jan. 16, 2018

(54) DIRECTIONAL DYNAMIC ABSOLUTE PRESSURE SENSOR SHROUD AND ARRANGEMENT

(71) Applicant: NORTHROP GRUMMAN SYSTEMS CORPORATION, Falls Church, VA (US)

(72) Inventors: Christopher A. Harris, Los Angeles, CA (US); Yuan Li, San Jose, CA (US); Russell V. Westphal, Atascadero, CA (US); Kris I. Lawrence, Gold River, CA (US); Htet Htet Oo, Daly City, CA (US); James A. Gerhardt, Atascadero, CA (US); Daniel R. Cuppoletti, Hermosa Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 60 days.

(21) Appl. No.: 15/226,544

(22) Filed: Aug. 2, 2016

(51) Int. Cl.
*G01F 1/46* (2006.01)
*G01F 1/34* (2006.01)

(52) U.S. Cl.
CPC ..................... *G01F 1/34* (2013.01)

(58) Field of Classification Search
CPC ................. G01F 1/34; G01F 1/46; G01F 1/84
See application file for complete search history.

(56) References Cited

U.S. PATENT DOCUMENTS

| 3,029,639 A | 4/1962 | Groesbeck | |
|---|---|---|---|
| 5,423,209 A | 6/1995 | Nakaya et al. | |
| 5,544,526 A * | 8/1996 | Baltins | G01P 5/165 73/180 |
| 6,012,331 A * | 1/2000 | Menzies | G01C 23/005 73/180 |
| 6,076,963 A * | 6/2000 | Menzies | G01K 13/02 374/135 |
| 6,609,421 B2 * | 8/2003 | Cronin | G01P 5/165 73/170.01 |
| 6,901,814 B2 * | 6/2005 | Vozhdaev | G01P 13/02 73/170.02 |
| 6,957,586 B2 * | 10/2005 | Sprague | G01F 1/3209 73/204.21 |
| 7,010,970 B2 | 3/2006 | Rediniotis et al. | |
| 7,107,835 B2 | 9/2006 | Korniyenko et al. | |
| 7,392,710 B1 | 7/2008 | Ben-Mansour et al. | |
| 7,549,331 B1 | 6/2009 | Powell | |
| 7,779,699 B2 | 8/2010 | Kurtz et al. | |

(Continued)

*Primary Examiner* — Jewel V Dowtin
(74) *Attorney, Agent, or Firm* — John A. Miller; Miller IP Group, PLC

(57) ABSTRACT

A pressure sensor assembly for simultaneously providing a time-resolved total pressure measurement and steady state flow angles of an airflow. The assembly includes an outer shroud having a front face, a rear face and a central bore having a wall. A dynamic absolute pressure sensor is positioned within the bore and provides a time-resolved total airflow pressure measurement. First and second spaced apart static pressure ports extend from the front face of the shroud to the rear face of the shroud and adjacent to the bore. The pressure ports provide a pressure that can be measured by pressure probes, where a combination of the time-resolved total pressure measurement and pressure measurements from the probes provides a steady state flow angle of the airflow.

20 Claims, 2 Drawing Sheets

(56) References Cited

U.S. PATENT DOCUMENTS

| | | |
|---|---|---|
| 8,413,501 B2 | 4/2013 | Tavares et al. |
| 9,128,005 B2 | 9/2015 | Snider et al. |
| 9,243,963 B2 | 1/2016 | Thorpe et al. |
| 9,541,429 B2 * | 1/2017 | Farokhi .................. G01P 5/165 |
| 2014/0064334 A1 | 3/2014 | Watkins et al. |
| 2015/0337678 A1 | 11/2015 | Alonte et al. |
| 2016/0011065 A1 | 1/2016 | Ned et al. |

* cited by examiner

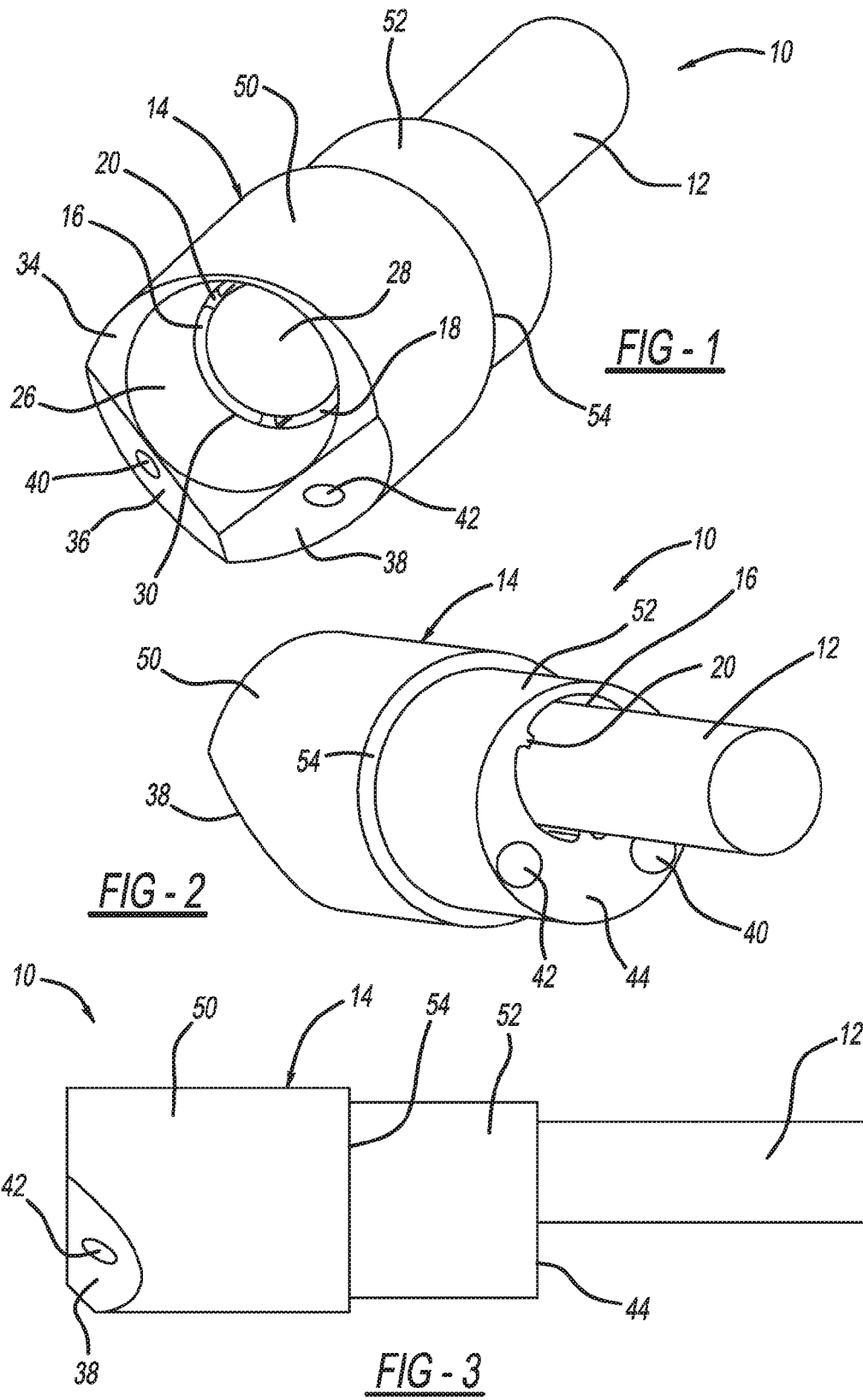

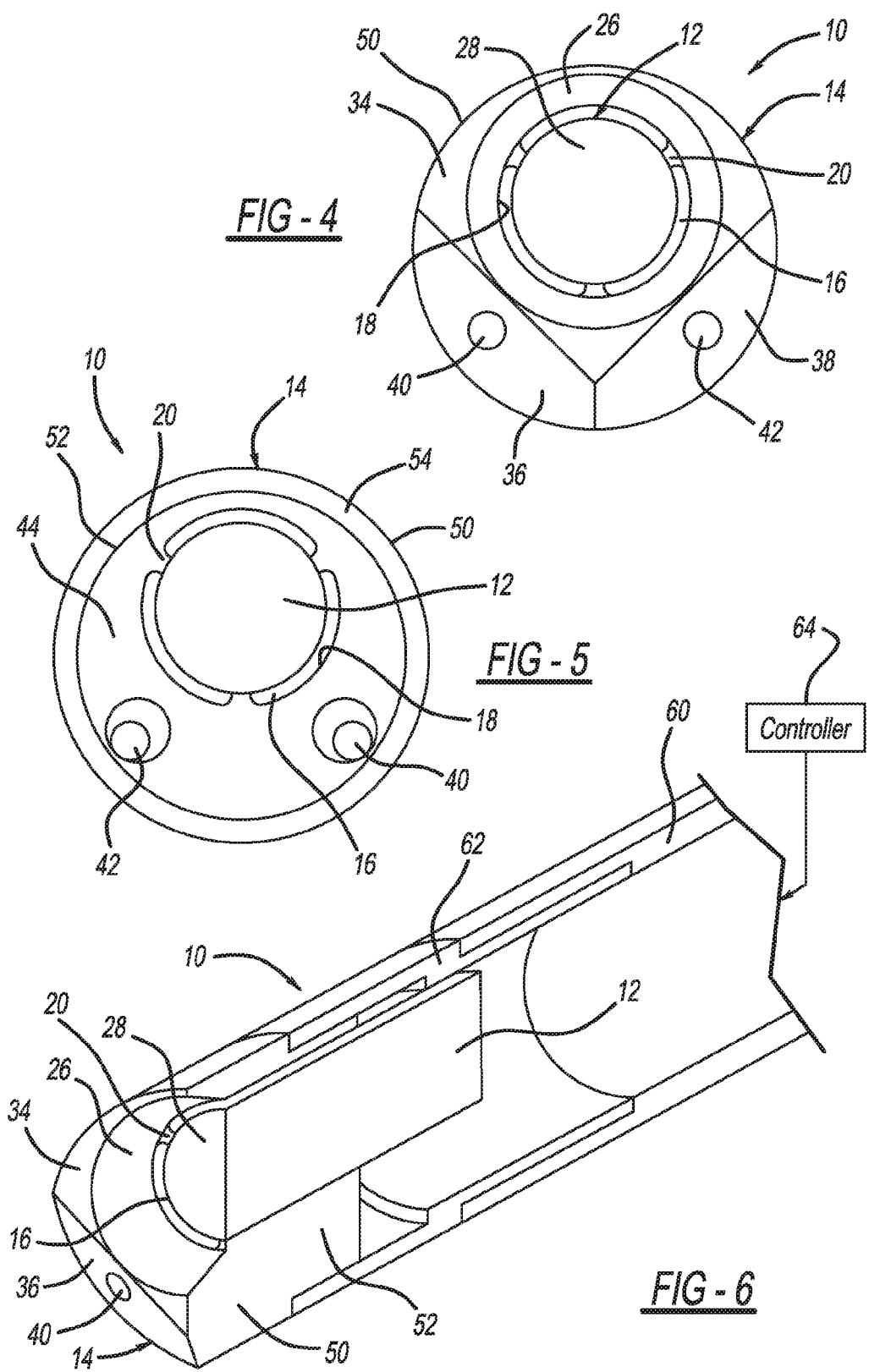

DIRECTIONAL DYNAMIC ABSOLUTE PRESSURE SENSOR SHROUD AND ARRANGEMENT

BACKGROUND

Field

This invention relates generally to a directional dynamic absolute pressure sensor assembly and, more particularly, to a directional dynamic absolute pressure sensor assembly that includes a dynamic pressure sensor positioned within a shroud, where the shroud includes a pair of non-concentric static pressure ports, and where pressure measurements provided by the pressure sensor and measured airflow provided by the pressure ports are used to determine airflow direction and dynamic absolute pressure.

Discussion

Some modern high performance aircraft must have the capability to operate at supersonic speeds, i.e., above Mach 1, which requires the aircraft to be highly aerodynamic and relatively low weight. In order to operate at supersonic speeds, the engines of such aircraft require a relatively large air inlet, where a typical air inlet for a supersonic aircraft will include a specially shaped leading edge, sometimes referred to as a cowl, and/or compression ramps that reduce the speed of the airflow into the engine to be suitable for proper operation of the engine.

Aircraft designs must go through rigorous testing and analysis to determine the flight capabilities of the aircraft. When testing the design of an air inlet of an engine for a high performance aircraft, an array of airflow sensors are often strategically located at certain positions on a test fixture so as to determine airflow pressure. More specifically, an array of dynamic absolute pressure sensors are generally located at the aerodynamic interface plane in front of the engine face to identify localized regions of pressure variations that may negatively impact engine operability. By knowing the pressure distribution at the aerodynamic interface plane, design modifications can be made to ensure that engine stalls do not occur during flight. Further, by knowing the angle of air entering the air inlet of the engine, the design of engine fan blades can be optimized. However, the known sensor arrays do not detect the flow angularity and swirl induced by the curvature of embedded inlets.

Typically, a five-hole probe is employed for determining the airflow pressure and direction for this purpose. A five-hole pressure probe includes five static ports at the tip of the probe so that depending on the flow of air at the tip of probe, five different static pressure measurements are provided, where the difference between the static pressures at adjacent ports can be used to identify airflow in both pitch and yaw directions. However, since the five-hole probe only measures steady state of the flow angles it does not measure the absolute time-resolved pressure of the airflow. Thus, it would be desirable to provide multiple measurements simultaneously including the total steady state pressure and the time-resolved pressure. Further, since the five-hole probe requires five holes, it has a fairly large diameter, which causes airflow blockage. Also, a five-hole probe is used to perform a separate test, thus requiring two separate tests to measure time-resolved total pressure and flow angles.

BRIEF DESCRIPTION OF THE DRAWINGS

FIG. 1 is a front isometric view of a pressure sensor assembly that measures air pressure and airflow direction in both pitch and yaw;

FIG. 2 is a back isometric view of the pressure sensor assembly shown in FIG. 1;

FIG. 3 is a side view of the pressure sensor assembly shown in FIG. 1;

FIG. 4 is a front view of the pressure sensor assembly shown in FIG. 1;

FIG. 5 is a back view of the pressure sensor assembly shown in FIG. 1; and

FIG. 6 is a cross-sectional isometric view of the pressure sensor assembly shown in FIG. 1 attached to a test fixture.

DETAILED DESCRIPTION OF THE EMBODIMENTS

The following discussion of the embodiments of the invention directed to a directional dynamic pressure sensor assembly for simultaneously measuring time-resolved total pressure and airflow direction in both pitch and yaw is merely exemplary in nature, and is in no way intended to limit the invention or its applications or uses. For example, as discussed herein, the directional dynamic pressure sensor assembly has particular application for testing airflow time-resolved total pressure and direction at an air inlet of an engine for an aircraft. However, the pressure sensor assembly may have other applications.

FIG. 1 is a front isometric view, FIG. 2 is a back isometric view, FIG. 3 is a side view, FIG. 4 is a front view and FIG. 5 is a rear view of a pressure sensor assembly 10 that can simultaneously measure air pressure and flow direction. The assembly 10 includes a cylindrical dynamic absolute pressure sensor 12 mounted to and surrounded by a concentric cylindrical shroud 14, where the sensor 12 measures time-resolved total air pressure. The sensor 12 can be any sensor suitable for the purposes discussed herein, such as a miniature total pressure sensor available from Kulite™. The sensor 12 is positioned within a central bore 16 in the shroud 14 in a manner that provides an air passage between the sensor 12 and a wall 18 of the bore 16 so as to allow air to flow through the assembly 10 for aspiration purposes and to provide the desired time-resolved total pressure over time for proper inlet design. Particularly, as the angle of the airflow on the front face of the assembly 10 increases, the ability of the sensor 12 to provide an accurate time-resolved total pressure measurement decreases. Therefore, by providing the gap between the wall 18 and sensor 12, more airflow is able to impinge the sensor 12. Thus, the measurements provided by the sensor 12 have a flatter response across a larger airflow impingement angle.

As is apparent, the bore 16 is offset from a center axis of the shroud 14. In this non-limiting embodiment, the sensor 12 is mounted to the wall 18 of the bore 16 by three struts 20. The bore 16 transitions into a tapered front portion 26, where a front face 28 of the sensor 12 is positioned proximate a shoulder 30 between the bore 16 and the tapered portion 26. In this non-limiting embodiment, the tapered portion 26 has about a 10% taper to improve airflow performance.

A front face 34 of the shroud 14 includes a pair of 45° chamfered portions 36 and 38 defining a general V configuration, as shown, where the chamfer direction of the portions 36 and 38 is towards the rear of the shroud 14. It is noted that the front face 34 could have other configurations, such as conical and rounded configurations. Further, in other embodiments, the angle of the chamfered portions 36 and 38 may be other than 45°, such as between 30 and 60°. A first static pressure port 40 extends through the shroud 14 from the chamfered portion 36 to a rear surface 44 of the shroud 14, and a second static pressure port 42 extends from the chamfered portion 38 to the rear surface 44 of the shroud 14, where the shape of the chamfered portions 36 and 38 provide the ability to obtain pitch and yaw flow measurements.

As mentioned, the sensor assembly 10 will likely be mounted to a test fixture for testing airflow at certain locations on an air inlet for a certain aircraft engine design. In this non-limiting embodiment, the shroud 14 includes a front cylindrical portion 50 and a rear cylindrical portion 52 defining a shoulder 54 therebetween. This configuration of the shroud 14 allows the assembly 10 to be easily secured to certain test fixtures. For example, FIG. 6 is a cut-away isometric view of the assembly 10 being coupled to a test fixture 60 by an adapter 62, where the test fixture 60 is intended to represent any particular fixture that the assembly 10 may be mounted to. It is noted that the adapter 62 and the test fixture 64 are cylindrical members that allow wires and such (not shown) coupled to the sensor 12 to extend down the members. Further, airflow through the ports 40 and 42 is also directed by the adapter 62 and the fixture 60 to a particular static probe (not shown).

The assembly 10 simultaneously measures the time-resolved total pressure and the steady state flow angle using the sensor 12 and the static probes coupled to the ports 40 and 42. The flow angle measurements require data from all three of the sensor 12 and the probes, where a data reduction algorithm running in a controller 64 backs out the pitch and yaw measurements of the airflow.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A pressure sensor assembly for simultaneously providing a time-resolved total pressure and steady state flow angles of an airflow, said assembly comprising:
    an outer shroud including a front face, a rear face, and a central bore having a wall;
    a dynamic absolute pressure sensor positioned within the bore and providing a time-resolved total pressure measurement of the airflow; and
    first and second spaced apart static pressure ports extending from the front face of the shroud to the rear face of the shroud and adjacent to the bore, said first and second pressure ports providing a pressure that can be measured by pressure probes, wherein a combination of the time-resolved total pressure measurement and pressure measurements from the probes provides a steady state flow angle of the airflow.

2. The assembly according to claim 1 wherein the absolute pressure sensor is positioned within the bore so as to be spaced from the wall and allow the airflow to flow through the bore between the sensor and the wall.

3. The assembly according to claim 1 wherein the central bore includes a cylindrical portion and a front tapered portion extending through the front face of the shroud, wherein a front surface of the sensor is positioned at a location where the bore transitions from the cylindrical portion to the tapered portion.

4. The assembly according to claim 2 wherein the tapered portion has a 10° taper.

5. The assembly according to claim 1 wherein the central bore is offset from a center axis of the shroud.

6. The assembly according to claim 1 wherein the front face of the shroud includes a first chamfered portion and a second chamfered portion where the first port extends through the first chamfered portion and the second port extends through the second chamfered portion.

7. The assembly according to claim 6 wherein the first and second chamfered portions are configured in a V-shape.

8. The assembly according to claim 6 wherein the chamfered portions have a 30-60° angle relative to a length of the shroud.

9. The assembly according to claim 1 wherein the shroud has a cylindrical shape and includes a front cylindrical portion and a rear cylindrical portion where the rear cylindrical portion has a smaller diameter than the front cylindrical portion so as to define a mounting shoulder therebetween.

10. The assembly according to claim 1 wherein the pressure sensor assembly has application for testing airflow for an aircraft engine inlet, and where the combination of the time-resolved total pressure measurement and the pressure measurements from the probes provide airflow direction in yaw and pitch.

11. A pressure sensor assembly for simultaneously providing a time-resolved total pressure and steady state flow angles of an airflow, said assembly comprising:
    an outer shroud including a front face, a rear face, and a central bore having a wall, wherein the central bore includes a cylindrical portion and a front tapered portion extending through the front face of the shroud, and wherein the central bore is offset from a center axis of the shroud;
    a dynamic absolute pressure sensor positioned within the bore and providing a time-resolved total pressure measurement, wherein the absolute pressure sensor is positioned within the bore so as to be spaced from the wall and allow the airflow to flow through the bore between the sensor and the wall; and
    first and second spaced apart static pressure ports extending from the front face of the shroud to the rear face of the shroud and adjacent to the bore, said first and second pressure ports providing a pressure that can be measured by pressure probes, wherein a combination of the time-resolved total pressure measurement and pressure measurements from the probes provides a steady state flow angle of the airflow.

12. The assembly according to claim 11 wherein a front surface of the sensor is positioned at a location where the bore transitions from the cylindrical portion to the tapered portion.

13. The assembly according to claim 11 wherein the tapered portion has a 10° taper.

14. The assembly according to claim 11 wherein the front face of the shroud includes a first chamfered portion and a second chamfered portion where the first port extends through the first chamfered portion and the second port extends through the second chamfered portion.

15. The assembly according to claim 14 wherein the first and second chamfered portions are configured in a V-shape.

16. The assembly according to claim 14 wherein the chamfered portions have a 30-60° angle relative to a length of the shroud.

17. The assembly according to claim 11 wherein the shroud has a cylindrical shape and includes a front cylindrical portion and a rear cylindrical portion where the rear cylindrical portion has a smaller diameter than the front cylindrical portion so as to define a mounting shoulder therebetween.

18. The assembly according to claim 11 wherein the pressure sensor assembly has application for testing airflow for an aircraft engine inlet, and where the combination of the time-resolved total pressure measurement and the pressure measurements from the probes provide airflow direction in yaw and pitch.

19. A pressure sensor assembly for simultaneously providing a time-resolved total pressure and steady state flow angles for testing airflow for an aircraft engine inlet, said assembly comprising:
 an outer shroud including a front face, a rear face, and a central bore having a wall, wherein the central bore is offset from a center axis of the shroud;
 a dynamic absolute pressure sensor positioned within the bore and providing a time-resolved total airflow pressure measurement; and
 first and second spaced apart static pressure ports extending from the front face of the shroud to the rear face of the shroud and adjacent to the bore, said first and second pressure ports providing a pressure that can be measured by pressure probes, wherein a combination of the time-resolved total pressure measurement and pressure measurements from the probes provides a steady state flow angle of the airflow in a yaw and pitch direction.

20. The assembly according to claim 19 wherein the front face of the shroud includes a first chamfered portion and a second chamfered portion where the first port extends through the first chamfered portion and the second port extends through the second chamfered portion, said first and second chamfered portions being configured in a V-shape.

* * * * *